United States Patent [19]
Suzuki et al.

[11] Patent Number: 5,714,233
[45] Date of Patent: Feb. 3, 1998

[54] METAL SANDWICH STRUCTURAL BODY AND MANUFACTURE THEREOF

[75] Inventors: Nobuyuki Suzuki, Yokohama; Wataru Asai, Kakamigahara; Masato Yamagahana, Yokohama, all of Japan

[73] Assignee: Japan Aircraft Mfg. Co., Ltd., Yokohama, Japan

[21] Appl. No.: 601,306

[22] Filed: Feb. 16, 1996

[30] Foreign Application Priority Data

Feb. 24, 1995 [JP] Japan ................... 7-037086

[51] Int. Cl.⁶ .................. B32B 3/12; B23K 31/00
[52] U.S. Cl. .................. 428/178; 428/72; 228/136; 228/157; 228/164; 228/173.1
[58] Field of Search .......... 428/178, 72; 156/60; 228/157, 136, 104, 173.1; 52/773.11; 244/126, 125, 119

[56] References Cited

U.S. PATENT DOCUMENTS

| | | | |
|---|---|---|---|
| 4,361,262 | 11/1982 | Israeli | 228/157 |
| 4,393,987 | 7/1983 | Anderson et al. | 228/157 |
| 5,115,963 | 5/1992 | Yasui | 228/157 |
| 5,118,026 | 6/1992 | Stacher | 228/157 |
| 5,204,161 | 4/1993 | Pettit et al. | 428/178 |
| 5,366,787 | 11/1994 | Yasui et al. | 428/178 |

FOREIGN PATENT DOCUMENTS 3291122  12/1991  Japan.
2095137  10/1982  United Kingdom.

*Primary Examiner*—Donald Loney
*Attorney, Agent, or Firm*—John P. White

[57] ABSTRACT

A metal sandwich structural body and manufacture thereof is provided in such a manner that a core body composed of a pair of core members is provided between surface plates made of superplastic metallic materials, these core members are bonded to the surface plates, free end parts of these core members are made integral to each other and following evagination of the surface plates the core members are raised and thus a three-dimensional core body is formed and, when the surface plates are evaginated, the free end parts of the core members are slightly moved while no movement occurs in bonded portions between the core members and the surface plates and thus a metal sandwich structural body having an optional form can be formed by preventing unfavorable deformation and irrespective of forms.

9 Claims, 6 Drawing Sheets

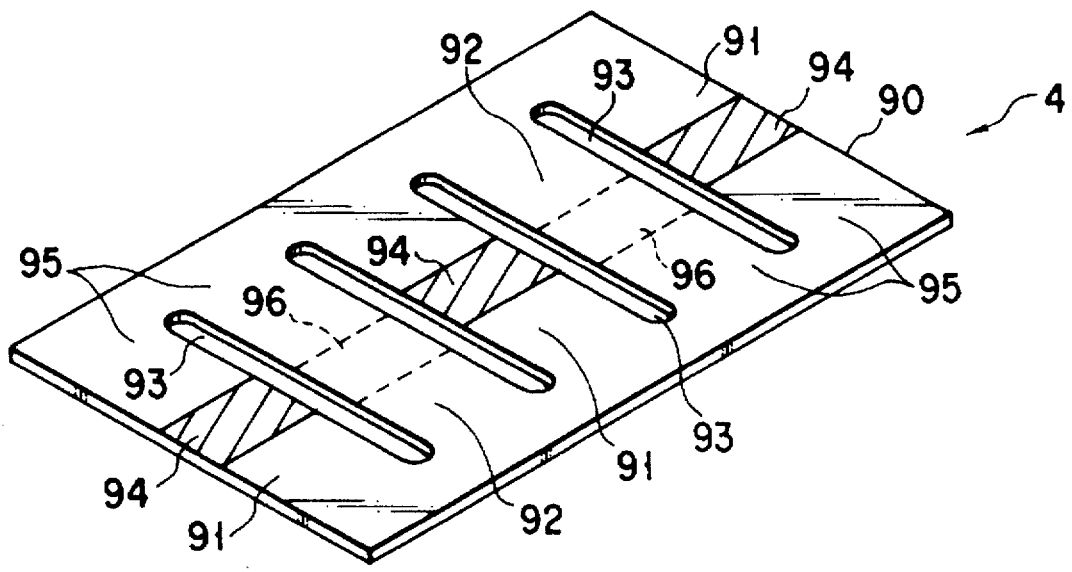
F I G. 19
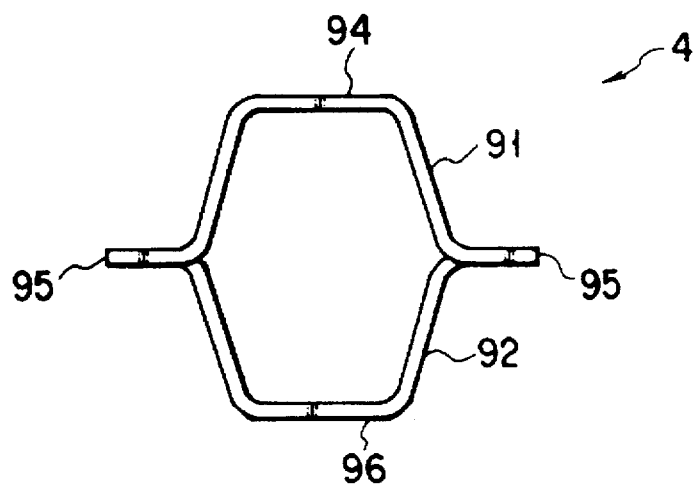
F I G. 20

METAL SANDWICH STRUCTURAL BODY AND MANUFACTURE THEREOF

BACKGROUND OF THE INVENTION

1. Field of the Invention

The present invention relates to a structure of a metal sandwich structural body using a metal plate made of a superplastic metallic material and a manufacture thereof.

In particular, the invention relates, when a sandwich structural body having a specified form is manufactured by evaginating a surface plate made of a superplastic metallic material, to a metal sandwich structural body and a manufacture thereof capable of preventing this surface plate from being unfavorably deformed by means of a resistance of a core body to deformation.

2. Description of the Related Art

Conventionally, a light weight, a high strength and high rigidity have been required for a structural body such as an airplane body and the like. As a material for meeting these requirements, an aluminum alloy has conventionally been used. However, this aluminum alloy has not been satisfactory in terms of resistances to heat and corrosion. In particular, inadequate corrosion resistance leads, in the case of an airplane, to an increase in maintenance costs including a corrosion control and others for the body.

In order to solve such a problem, recently a titanium alloy has been considered as a structural material for an airplane body. This titanium alloy is light in weight, high in strength and excellent in terms of resistances to heat and corrosion and thus has been put to use for various purposes in addition to that for structuring the body of the airplane. But processing of this titanium alloy is rather difficult. As means for eliminating such low processability of the titanium alloy, there are available titanium alloy superplastic processing (SFP) or diffused bonding processing (DB). By using these means in combination, it is possible to process the titanium alloy to an optional form with low costs.

As for a structural body of the airplane, a sandwich structural body is better as a structure for achieving a light weight, a high strength and high rigidity. In the case of a conventional sandwich structural body, a surface plate and a core were manufactured by using various materials such as an aluminum alloy, a fiber reinforcing resin material and the like and these were bonded together so as to be made integral. Therefore, the sandwich structural body thus manufactured was not satisfactory in terms of a resistance to heat or corrosion.

In order to solve such a problem, consideration has been given to manufacturing of a sandwich structural body by means of a titanium alloy. The sandwich structural body manufactured by using the titanium alloy may satisfy all kinds of requirements, including a light weight, a high strength, high rigidity, high resistances to heat and corrosion and others.

The metal sandwich structural body made of such metallic materials as a titanium alloy and the like is assembled by welding a surface plate and a core body made by shaping a metal plate to a specified form. But such a manufacturing method allowed manufacturing of only a structural body having a planar or a relatively simple form.

In order to eliminate these inconveniences, a sandwich structural body using a superplastic metallic material of a titanium alloy, etc., has been developed. The sandwich structural body using this superplastic metallic material is manufactured in such a way that planar surface plates and a core material made of superplastic metallic materials are laminatingly bonded together, then these are housed in a molding die, a pressurized gas is supplied between these surface plates while maintaining an atmosphere having a temperature so as to generate material deformation, the surface plates are evaginated by superplastic deformation by using a pressure of this gas, adhered to an inner surface of the molding die and molded to specified forms. When these are evaginated, the core material is superplastically deformed following the evagination of the surface plates and this is raised with the surface plates roughly vertically so as to form a riblike core body.

Such a sandwich structural body using the superplastic metallic material has the advantage of being easily manufactured even in a complex form. On the other hand, the conventional sandwich structural body and the manufacture thereof were inconvenient because of unfavorable deformation occurred in the surface plate during manufacturing of the sandwich structural body and excessive deformation occurred locally.

As a sandwich structural body manufactured in this way, there is one, in which a beltlike core material is provided between a pair of planar surface plates, one end of this core material is coupled to one surface plate while the other end is coupled to the other surface plate and then a pressurized gas is supplied between these surface plates so as to evaginate the surface plates. In this case, following the evagination of the surface plates, the beltlike core material is raised roughly vertically with these surface plates or up to an oblique angle and thereby a riblike and three-dimensional core body is formed.

When such a core material is raised, portions of the surface plates to which both ends of this core material are coupled are moved relatively in a direction along the faces of the surface plates. Conventionally, the structural body has been designed so that such a movement can be absorbed by superplastic deformation of the surface plates or the core material.

However, even when superplastic deformation occurs in the core material or the surface plates, there is a resistance to deformation thereof and thus due to this resistance unexpected deformation has occurred in the surface plates in the vicinity of the portions to which the core material is coupled or distortion, etc., has occurred in the whole molded sandwich structural body. Also, in such a conventional case, the surface plates and the core material need to be greatly deformed when the surface plates are evaginated and thus a case has occurred in which a limit of the superplastic deformation is exceeded, limiting a form, etc., of this sandwich structural body.

SUMMARY OF THE INVENTION

It is a primary object of the invention to provide a metal sandwich structural body to be easily molded to an optional form. In this metal sandwich structural body, surface plates and the whole body can be prevented from being unfavorably deformed without generating excessive plastic deformation in a core member or the surface plates when the surface plates are evaginated and also the structural body can be molded to an optional form by increasing a freedom of designing.

It is a secondary object of the invention to provide a method for manufacturing a metal sandwich structural body, by means of which the above-described metal sandwich structural body can be simply and surely molded.

The metal sandwich structural body according to the invention is provided with a pair of surface plates made of superplastic metallic materials and a core body provided between these surface plates. This core body is constructed by at least a pair of core members formed of metal plates to be plastic-deformed. One core member is bonded with an inner surface of one surface plate while the other core member is bonded with an inner surface of the other surface plate. At least one end of these core members is formed in a free end part and free ends of these core members are made integral to one another.

In the sandwich structural body of the invention, when the surface plates are evaginated, the core members are deformed and raised, forming a three dimensional core body. In this case, since deformation like bending occurs in bonded parts between the core members and the surface plates and parts between these core members and the free ends, these parts are moved in a direction roughly along the face directions of the surface plates. But as these core members are used in a pair and the free ends thereof are made integral to one another, the free ends are moved when these members are raised and thus the bonded parts between the core members and the surface plates are moved in a direction along the faces of the surface plates.

Therefore, no excessive plastic deformation occurs in the surface plates, etc., when the core members are raised and no unfavorable deformation occurs in these surface plates and the whole sandwich structural body, increasing a freedom of designing.

The core members are basically only bent and deformed when being raised and the amount of deformation is rather small. This makes it unnecessary to form the core members by superplastic metallic materials. But in a preferred embodiment of the invention, these core members are also made of superplastic metallic materials and thus these are easily deformed when being raised.

According to the manufacturing method of the invention, extensive and planar core members are provided between the surface plates, specified portions of these core members and the surface plates are diffusely coupled together and the free ends of the core members are simultaneously coupled together diffusely. Therefore, manufacturing steps are simple and efficient and also strong coupling is possible by means of diffused bonding.

Furthermore, in order to obtain good diffused bonded parts, uniform and highly accurately controlled pressing forces must be applied to coupled areas. According to the preferred embodiment of the invention, for carrying out this diffused bonding, pressing pads formed by laminating inorganic fibers are provided between the surface plates and pressing metallic molds. These pressing pads are compressed when sandwiching the surface plates by pressure and, when compression thereof occurs, the fibers can slightly move in the face direction of the surface plates. Therefore, if there are differences in plate thickness among the surface plates and the core members or projected and recessed parts, by means of the movement of the fibers in the face direction, each part of the pressing pads is compressed according to these differences or the projected and recessed parts and these surface plates and the core members are pressed uniformly, making it possible to perform sure diffused bonding.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 19 is a perspective view of a core body of a metal sandwich structural body in a seventh embodiment of the invention; and FIG. 20 is an elevational view of a state where the core body shown in FIG. 19 is raised.

DETAILED DESCRIPTION OF THE PREFERRED EMBODIMENTS

Figure 1:
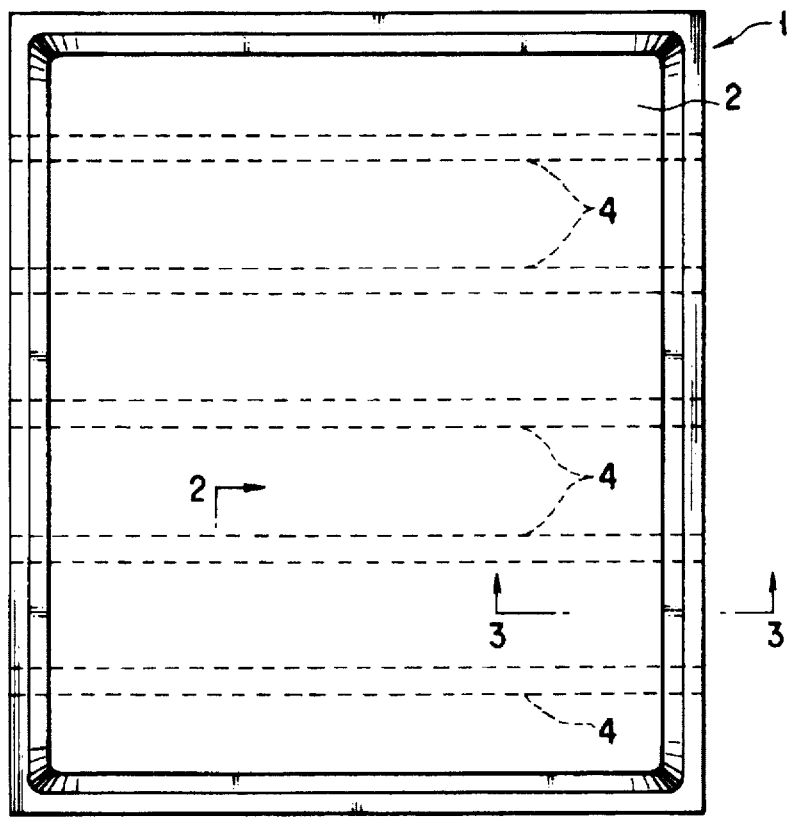
FIG. 1 is a plan view of a metal sandwich structural body in a first embodiment of the invention.
Figure 4:
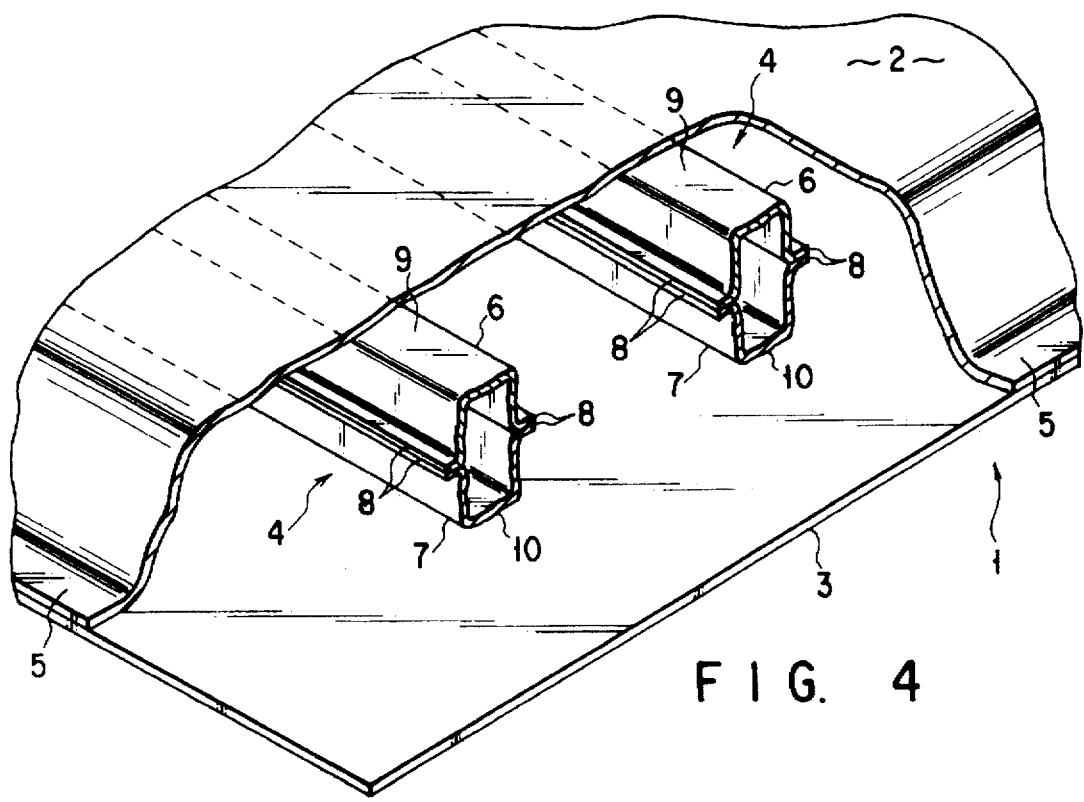
FIG. 4 is a partially cutaway view in perspective of the metal sandwich structural body in FIG. 1.

The preferred embodiments of the invention will now be described. The first embodiment of the metal sandwich structural body of the invention is shown in FIG. 1 or FIG. 4. This metal sandwich structural body 1 is constructed by a pair of surface plates 2 and 3 and a plurality of core bodies 4 provided between these surface plates. The surface plates 2 and 3 and the core bodies 4 are structured by metal plates made of superplastic metallic materials such as an aluminum alloy and the like. End parts 5 of the surface plates 2 and 3 are coupled together by means of seam welding and the surface plate 2 is evaginated. Between this evaginated surface plate 2 and the surface plate 3 the core bodies 4 are coupled having rectangular and hollow cross sections, forming a sandwich structure.

The structure of the core body 4 will now be described. This core body 4 is composed of a pair of core members 6 and 7. These core members 6 and 7 are in turn made of metal plates, a central part 9 of the core member 6 is diffusely coupled to an inner surface of the surface plate 2 and a central part 10 of the core member 7 is diffusely coupled to an inner surface of the surface plate 3. Neither end parts of these core members 6 and 7 are bonded to the surface plates 3 and constructed as free ends 8. The free ends 8 of these core members 6 and 7 are diffusely coupled to one another. Cross sections of these core members 6 and 7 are bent in roughly U forms and the free ends 8 are bent in flange forms.

Figure 2:
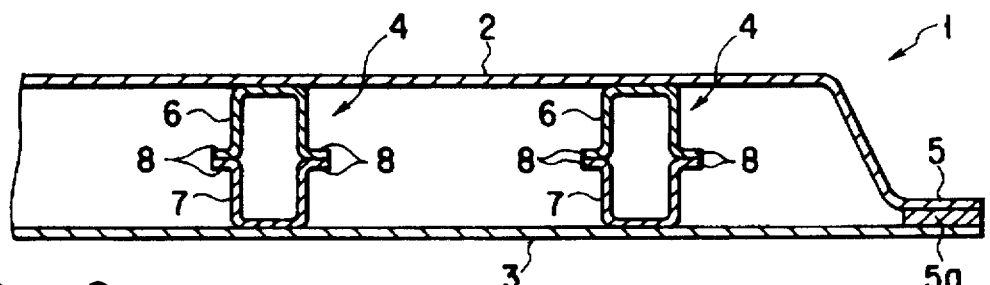
FIG. 2 is a sectional view along a 2—2 line in FIG. 1.
Figure 3:
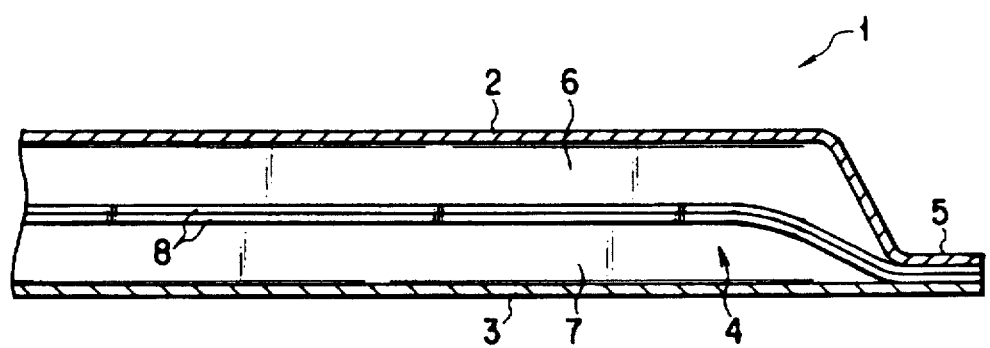
FIG. 3 is a sectional view along 3—3 line in FIG. 1.

Both end parts of these beltlike core members 6 and 7 are provided between end parts 5 of the surface plates 2 and 3 and made integral by means of seam welding during manufacturing (described later). When the surface plate 2 is evaginated, these ends are raised together with this evagination and, as shown in FIG. 3, the end parts of the core body 4 are continuously raised closely adhered to the surface plate 2. In portions of the end parts 5 of the surface plates 2 and 3 in which neither ends of the core members 5 and 6 are provided, there is provided a beltlike end member 5a as shown in FIG. 2, this end member 5a has a plate thickness equivalent to two pieces of the core members 6 and 7 and the end parts 5 of the surface plates 2 and 3 are welded to both surfaces of the end member 5a and the ends of the core members 6 and 7 flatly adhered thereto.

The metal sandwich structural body 1 thus constructed is provided with the hollow cylindrical core bodies 4 and thus a strength thereof is big and, also as described below, during manufacturing, no unfavorable deformation occurs in the surface plates 2 and 3 or the whole metal sandwich structural body 1.

Figure 5:
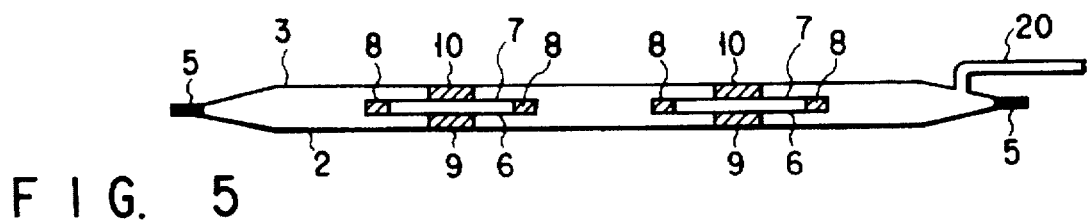
FIG. 5 is a view illustrating a manufacturing method of the invention.

Next, explanation will be made of a method for manufacturing the metal sandwich structural body 1 of the first embodiment by referring to FIG. 5 or 8. Description of a plate thickness of each member is omitted for the purpose of simplification of the drawings. Also in order to help understanding, portions scheduled to be bonded are indicated by diagonal lines while bonded portions are erased by black colors. However, there are no other members provided in these parts.

First, by punching metal plates made of superplastic metallic materials to specified forms, the planar surface plates 2 and 3 and the extensive and planar beltlike core members 6 and 7 are constructed. Then, as shown in FIG. 5, the core members 6 and 7 are disposed between these surface plates 2 and 3 and this disposition must be carried out so that the free ends 8 thereof are laminated together. As described above, the central parts 9 and 10 of the core members 6 and 7 are portions scheduled to be diffusely bonded to the surface plates 2 and 3 and also the free ends 8 of both ends of the core members 6 and 7 are portions scheduled to be diffusely bonded. Surfaces of the core members 6 and 7 and the surface plates 2 and 3 are treated clean, portions other than the above-described portions scheduled to be diffusely bonded are masked by means of fine powder coated layers so as to be prevented from being diffusely bonded. Fine powders used for this masking are ones made of inorganic materials having a resistance to heat, stable at a SPF/DB processing temperature, nonreactive to metallic materials and easily eliminated after processing.

The end parts 5 of the laminated surface plates 2 and 3 are bonded together by means of seam welding so as to be hermetically sealed. Inlet/outlet pipes 20 such as metal piles and the like are welded to the end parts of these surface plates.

Figure 6:
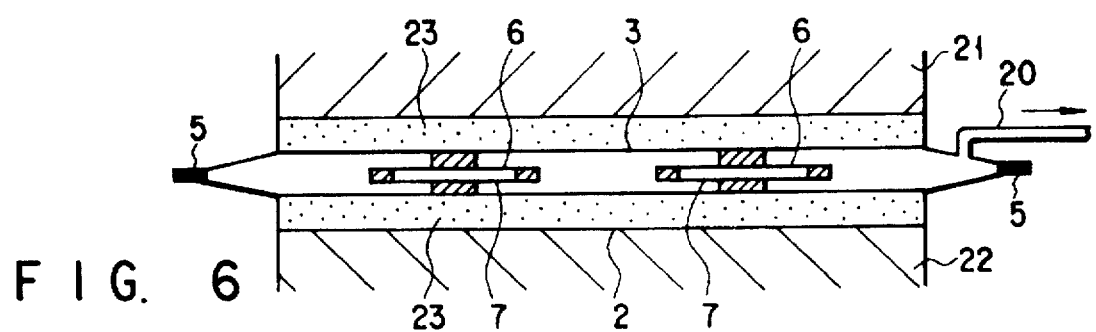
FIG. 6 is a view illustrating a manufacturing method of the invention.
Figure 7:
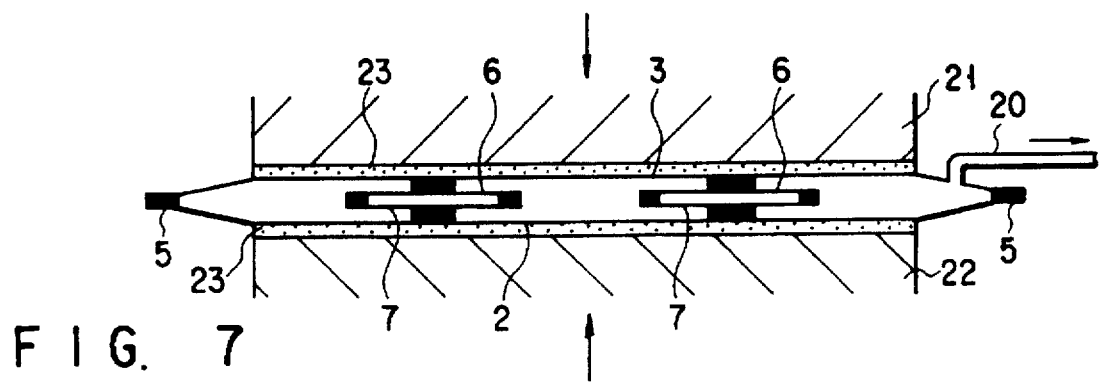
FIG. 7 is a view illustrating a manufacturing method of the invention.

Then, an assembly composed of the surface plates 2 and 3 and the core members 6 and 7 is provided, as shown in FIG. 6, between a pair of pressing metallic molds 21 and 22. Pressing pads 23 are provided between these pressing metallic molds 21 and 22 and the surface plates 2 and 3. This pressing pad 23 is formed by laminating fibers made of heat-resistant inorganic materials such as ceramic fibers and the like to a specified thickness, for instance a thickness of about 5 to 20 mm. The fibers are only laminated together in a felt form and thus when the pressing pad 23 is compressed, portions of the fibers can move by a certain distance in a direction along the faces of the surface plates 2 and 3. In this state, the assembly of the surface plates 2 and 3 and the core members 6 and 7 are heated to a specified temperature and air is discharged through the inlet/outlet pipes 20 so as to form a vacuum in a space between the surface plates 2 and 3.

When a specified temperature and a specified vacuum are reached, the assembly of the surface plates 2 and 3 and the core members 6 and 7 are compression-sandwiched by means of a specified pressure applied by the pressing metallic molds 21 and 22. By means of this compression-sandwiching, spaces among the inorganic fibers inside the pressing pads 23 are compressed. There may be differences in thickness among portions of the assembly due to differences in plate thickness or projected and recessed parts. In such a case, when the pressing pads 23 are compressed, the inorganic fibers therein are moved slightly along the faces of the surface plates 2 and 3. Thus, a thickness of the pressing pad 23 at the time of maximum compression is accordingly reduced in portions where the thickness of the assembly is large and conversely in portions where the thickness of the assembly is small the thickness of the pressing pad 23 is increased at the time of maximum compression. Therefore, even when there are generated differences in thickness among portions of the assembly, these differences are offset by means of the pressing pad 23, making it possible to press the assembly with a uniform pressure. By keeping this state for a specified period, the middle parts of the core members 6 and 7 are diffusely bonded to the inner surfaces of the surface plates 2 and 3 and the free ends of these core members are diffusely bonded to one another.

Because of the provision of the pressing pads 23, even when such metallic plates having relatively wide areas are diffusely bonded to a plurality of spots, the spots to which these are diffusely bonded are uniformly pressed, making it possible to perform sure bonding of these to the plurality of the spots.

As the pressing pads 23, ones made by laminating alumina/silicon dioxide type fibers to a thickness of about 5 to 20 mm in felt forms are used and also ones having a bulk density of 0.06 to 1.50 g/cm$^3$ are used. Preferably, a bulk density of this pressing pad must range from 0.06 to 0.30 g/cm$^3$. As such a pressing pad, there is available a brand named "KAOWOOL" sold by ISOLITE INSULATING PRODUCTS CO, LTD. in Osaka, Japan, which is made by laminating alumina/silicon dioxide type ceramic fibers. These can resist heat up to 1,000 or even 1,400° C. and are provided with sufficient heat resistances and mechanical characteristics even when diffused bonding is performed as in the above-described embodiment. Other than the above, silicon carbide or asbestos type fibers can be used for the pressing pads.

Figure 8:
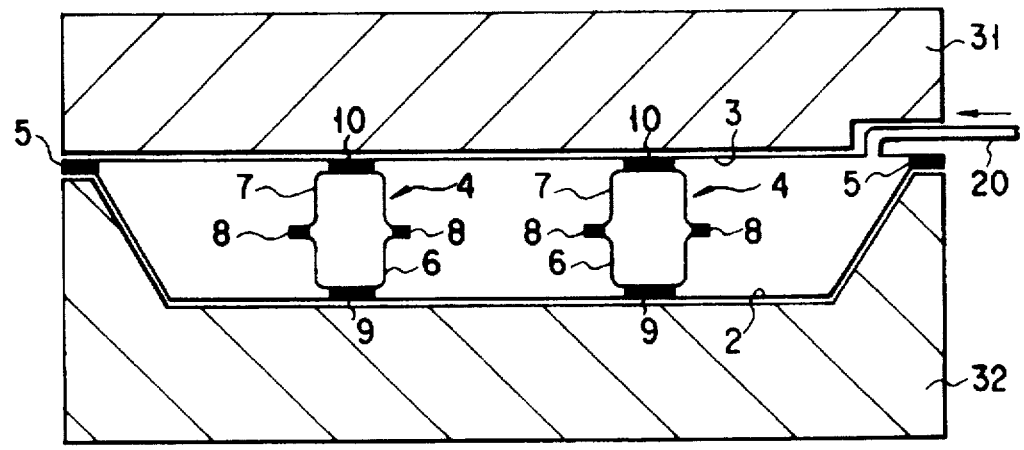
FIG. 8 is a view illustrating a manufacturing method of the invention.

The assembly formed by diffusely bonding the surface plates 2 and 3 and the core members 6 and 7 in the above-described manner are housed in molding metallic molds 31 and 32 as shown in FIG. 8 and by maintaining a specified superplastic deformation temperature pressurized fluids, for instance pressurized gases, are supplied through the inlet/outlet pipes 20. Therefore, because of these pressurized gasses, the surface plates, for instance the surface plate 2 is evaginated and closely adhered to the inner surfaces of the molding metallic molds 2 and 3, forming the metal sandwich structural body 1 having a specified form.

Following this evagination of the surface plate 2, the core members 6 and 7 are raised and the three-dimensional core body 4 is formed. In this case, bending occurs in portions between the central parts 9 and 10, the parts bonded to the surface plates 2 and 3, of the core members 6 and 7 and the free ends 8 of both end parts thereof. The central parts 9 and 10 and the free ends 8 are relatively moved in directions along the faces of the surface plates 2 and 3. These free ends 8 are not bonded to the surface plates 2 and 3 but rather bonded to one another in free states. Thus, the free ends 8 can freely move and the central parts 9 and 10 of the pair of the core members 6 and 7 are prevented from being relatively moved in the directions along the faces of the surface plates 2 and 3. When the core members 6 and 7 are raised, no excessive plastic deformation occurs in the surface plates 2 and 3. No unfavorable deformation occurs in the vicinity of the bonded portions between the surface plates 2 and 3 and the core members 6 and 7. Furthermore, undesired deformation is prevented from being generated in the whole metal sandwich structural body 1.

Figure 9:
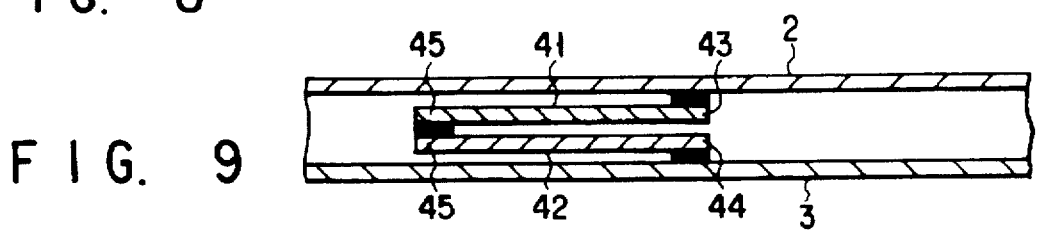
FIG. 9 is a partially sectional view of a core body of a metal sandwich structural body in a second embodiment of the invention.
Figure 10:
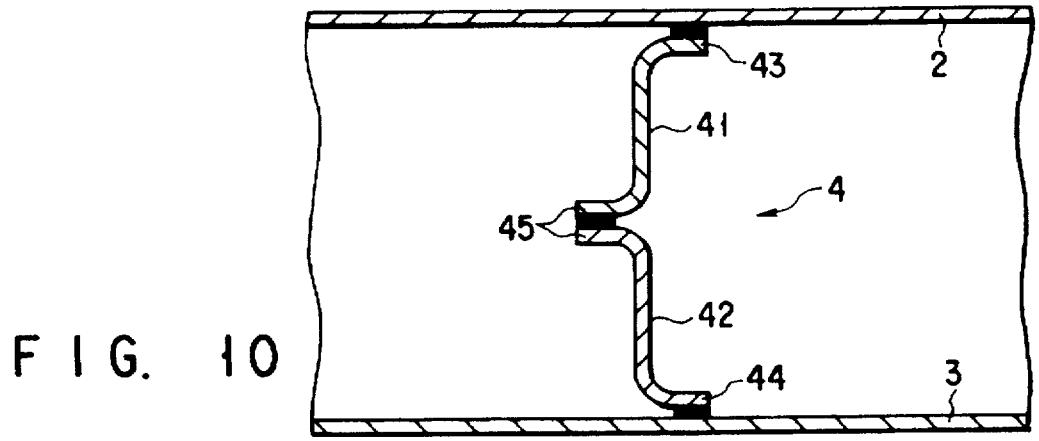
FIG. 10 is a sectional view of a state where the core body in shown in FIG. 9 is raised.

The invention is not limited to the above-described embodiment but various modifications are possible. For example, FIGS. 9 and 10 show a second embodiment of a metal sandwich structural body of the invention. In the embodiment, a pair of beltlike core members 41 and 42 are provided, end parts thereof 43 and 44 are bonded to surface plates 2 and 3 by means of diffused bonding, etc., the other end parts are formed in free ends 45 and these free ends 45 are bonded to one another.

Also, in the embodiment, because of evagination of the surface plates 2 and 3, the core members 41 and 42 are raised as shown in FIG. 10, constructing a three-dimensional core body 4.

Figure 11:
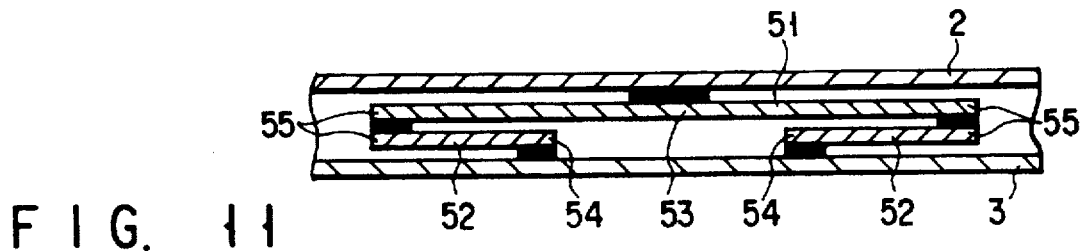
FIG. 11 is a partially sectional view of a core body of a metal sandwich structural body in a third embodiment of the invention.
Figure 12:
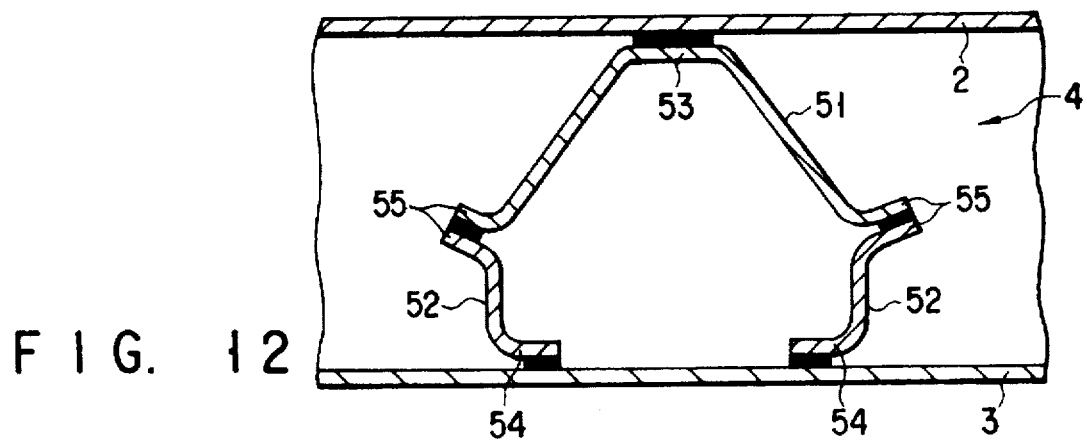
FIG. 12 is a sectional view of a state where the core body shown in FIG. 11 is raised.

FIGS. 11 and 12 show a third embodiment of a metal structural body of the invention. In the embodiment, a core body 4 is composed of a wide beltlike core member 51 and two narrow beltlike core members 52. A central part 53 of the core member 51 is bonded to a surface plate 2 while end parts of the two core members 52 are bonded to another surface plate 3. Both ends of the core member 51 are formed in a free step part 55 while those of the core members 52 are formed in free end parts 55 and these free end parts 55 are bonded to one another.

In the embodiment, following evagination of the surface plates 2 and 3, the core members 51 and 52 are raised as shown in FIG. 12 so as to from a three-dimensional core body 4.

Figure 13:
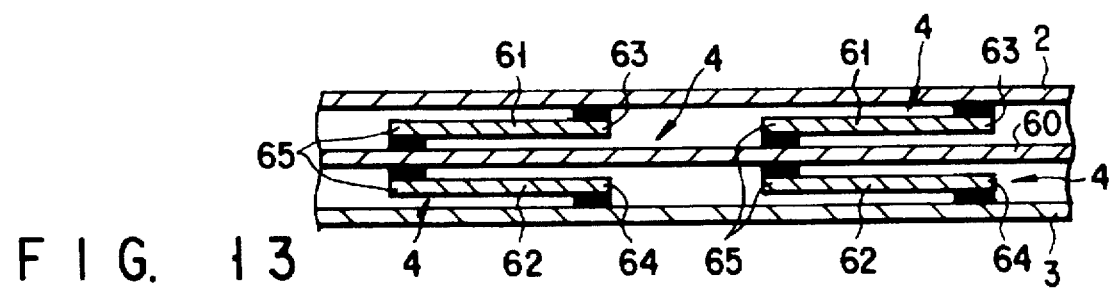
FIG. 13 is a partially sectional view of a core body of a metal sandwich structural body in a fourth embodiment of the invention.
Figure 14:
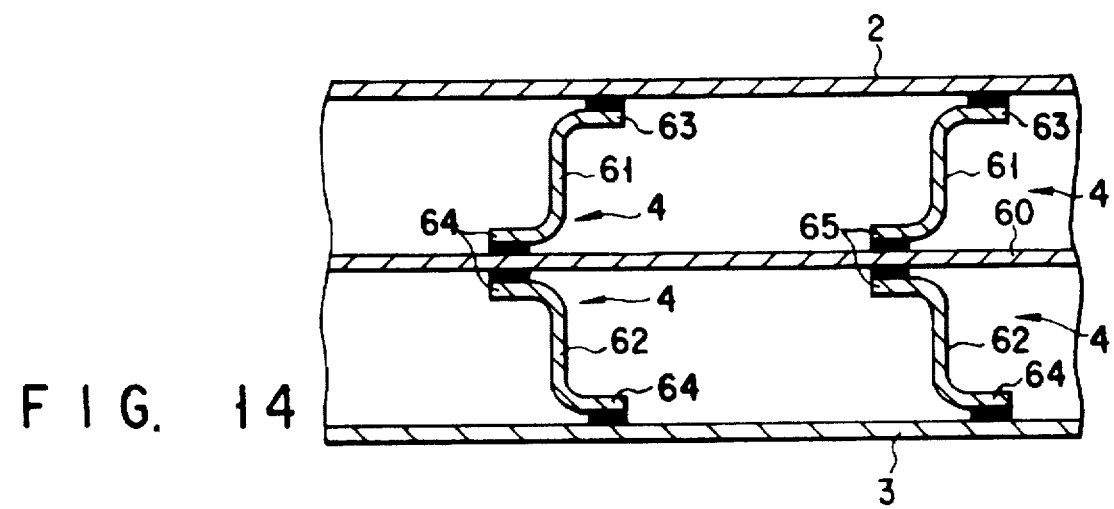
FIG. 14 is sectional view of a state where the core body shown in FIG. 13 is raised.

FIGS. 13 and 14 show a fourth embodiment of a metal sandwich structural body of the invention. In the embodiment, a structure is roughly similar to that of the second embodiment shown in FIGS. 9 and 10 and a middle plate 60 is provided between core members 61 and 62 and free ends 65 and bonded integrally with these free ends 65. This middle plate 60 is not bonded to surface plates 2 and 3 and, as shown in FIG. 14, can freely move with the free ends 65 when the core members 61 and 62 are raised.

According to the embodiment, since the free ends 65 of the core members 61 and 62, that is, the middle parts of the core body 4, are linked to each other via the middle plate 60, in particular when the metal sandwich structural body 2 is high and the core body 4 is long, it is possible to prevent the core body 4 from being buckled.

Figure 15:
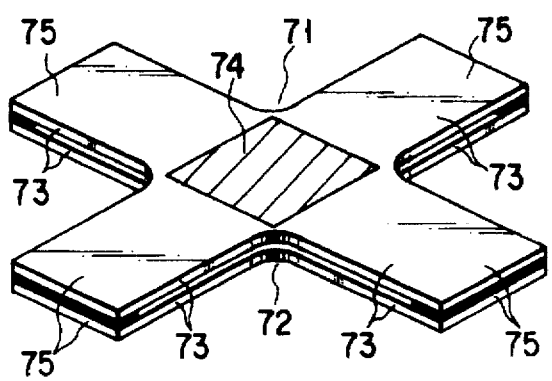
FIG. 15 is a perspective view of a core body of a metal sandwich structural body in a fifth embodiment of the invention.
Figure 16:
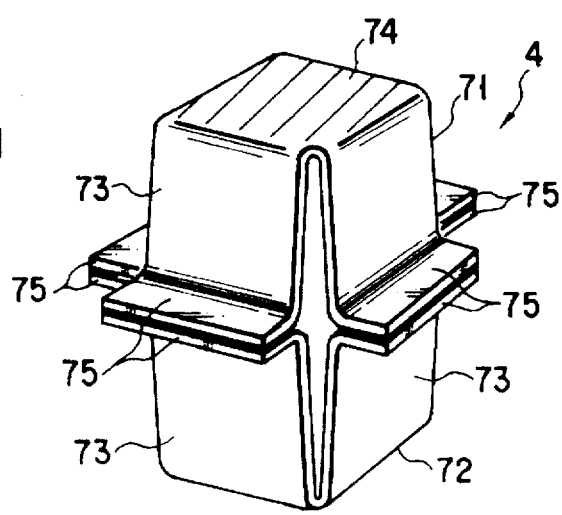
FIG. 16 is a perspective view of a state where the core body shown in FIG. 15 is raised.

FIGS. 15 and 16 show a fifth embodiment of a metal structural body of the invention. In the embodiment, a core body 4 is composed of a pair of core members 71 and 72 and these core members 71 and 72 are respectively provided with four radial leg parts 73. A central part 74 of the core members 71 and 72 is bonded to surface plates, the tip parts of the leg parts 73 are formed in free ends 75 and these free ends 75 are bonded to one another.

According to the embodiment, because of evagination of the surface plates, the core members 71 and 72 are raised in forms as shown in FIG. 16 and thus a core body 4 is formed. In the embodiment, the core body 4 is a block type different from that shown in the previous embodiments and the metal sandwich structural body is structured by providing a plurality of such block type core bodies 4 between the surface plates. This metal sandwich structural body is characterized in that an arraying density of the core bodies 4 can be changed according to a load applied to each part thereof and the core bodies 4 are provided with rigidity against two directions orthogonally crossing each other along face directions of the surface plates.

Figure 17:
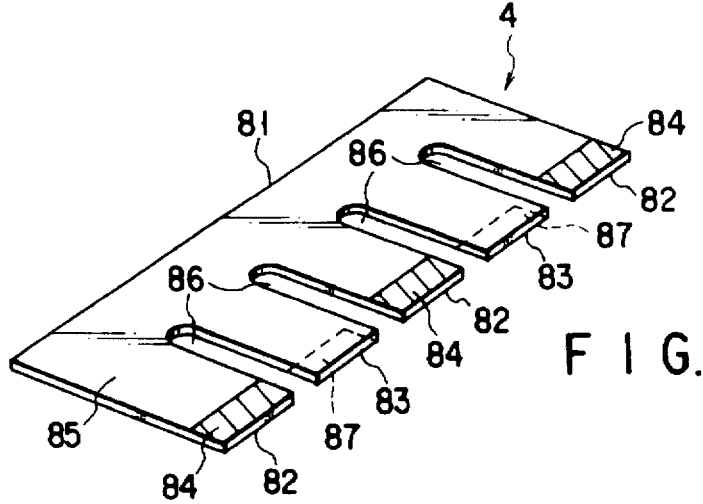
FIG. 17 is a perspective view of a core body of a metal sandwich structural body in a sixth embodiment of the invention.
Figure 18:
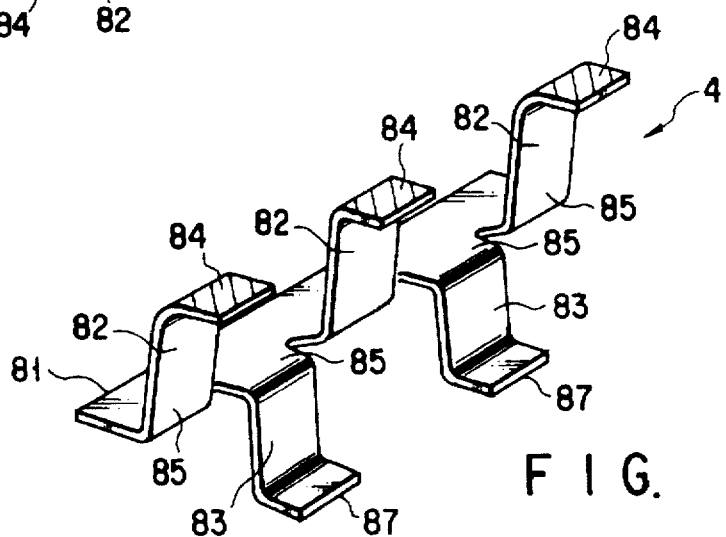
FIG. 18 is a perspective view of a state where the core body shown in FIG. 17 is raised.

FIGS. 17 and 18 show a sixth embodiment of a metal sandwich structural body of the invention. In the embodiment, a core body 4 is composed of a beltlike member 81 and this beltlike member 81 is divided into a plurality of core member pieces 82 and 83 by means of a plurality of notches 86. The core member piece 83 is provided substantially as a core member while the core member 82 is provided substantially as another core member. A bonded part 84 of the tip part of the core member piece 82 is bonded to an inner face of a surface plate and a bonded part 87 of the tip part of the other core member 83 is bonded to an inner face of another surface plate. Base end parts of these core member pieces 82 and 83 are constructed substantially as free ends 85 and these are connected together integrally.

According to the embodiment, because of evagination of the surface plates, the core members are raised as shown in FIG. 18, forming a three-dimensional core body 4. The two core member pieces 82 and 83 functioning as two core members can be formed in the single beltlike member 81 and thus a structure can be made simple.

FIGS. 19 and 20 show a seventh embodiment of a metal sandwich structural body of the invention. In the embodiment, a core body 4 is composed of a beltlike member 90, a plurality of notches 93 are formed in a central part of this beltlike member 93 and by means of these notches this beltlike member 93 is divided into a plurality of core member pieces 91 and 92. The core member piece 91 is provided substantially as a core member while the core member piece 92 is provided substantially as another core member. A central part 94 of the core member piece 91 is bonded to an inner face of a surface plate and a central part 96 of the core member piece 94 is bonded to an inner face of another surface plate. Both end parts of these core member pieces 91 and 92 are constructed substantially as free ends 95 and these are linked together integrally.

According to the embodiment, because of evagination of the surface plates the core members are raised as shown in FIG. 20, forming a three-dimensional core body 4. Also, as in the case of the above-mentioned embodiment, the two core member pieces 91 and 92 functioning as the two core members can be formed in the single beltlike member 90 and thus a structure can be made simple.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A metal sandwich structural body comprising:
    a pair of surface plates made of superplastic metal material; and
    a plurality of core bodies interposed between the surface plates,
    wherein each core body is comprised of at least two core members made of deformable plastic metal plates, each having end portions and a middle portion;
    the middle portion of said core members or one end thereof is bonded to the inner surface of one of said surface plates;
    the middle portion of the other of said core members or one end thereof is bonded to the inner surface of the other surface plate; and
    said core members are bonded to each other at both ends or at one end, to form at least two free end portions or at least one free end portion, movable with respect to the surface plates.

2. A metal sandwich structural body according to claim 1, wherein the core members are formed of superplastic metallic materials.

3. A metal sandwich structural body according to claim 1, wherein the core members and the surface plates are bonded and the free end parts of these core members are bonded to one another, by means of diffused bonding.

4. A metal sandwich structural body according to claim 1, wherein middle parts of the core members are bonded to the inner faces of the surface plates, end parts of these core members are formed in free end parts and these free end parts of the core members are bonded to each other.

5. A metal sandwich structural body according to claim 1, wherein one end parts of the core members are bonded to the inner faces of the surface plates, the other end parts of the core members are bonded to free end parts and the free end parts of the other end parts of the core members are bonded to each other.

6. A metal sandwich structural body according to claim 4, wherein the core members are formed beltlike, central parts of these beltlike core members are bonded to the surface plates, both end parts of these beltlike core members are formed in free end parts and both end parts of these core members are bonded to each other.

7. A method for manufacturing a metal sandwich structural body having a pair of surface plates made of superplastic metallic materials and core bodies provided between these surface plates characterized in that these core bodies are formed by metal plates to be plastic-deformed, comprising:
    a step for forming at least a pair of planar surface plates and planar core members by punching metal plates to specified forms;
    a step for providing the core members between the surface plates, disposing these core members in specified positions with respect to the surface plates;
    a step for maintaining a space between the pair of the surface plates in a vacuum atmosphere, pressure-welding the surface plates and the core members by means of a pair of pressing metallic molds by heating these and diffusely bonding portions between specified parts of the core members and the surface plates; and
    a step for housing the diffusely bonded surface plates and core members in molding metallic molds having specified forms, supplying pressurized fluids into a space between the surface plates, evaginating the surface plates by means of superplastic deformation and closely adhering these to inner faces of the molding metal molds and forming core bodies having specified forms by bending portions between the bonded parts between the core members and the surface plates and the free end parts by means of evagination of the surface plates.

8. A method for diffusely bonding metal plate members by laminating these comprising:
    a step for constructing a metal plate laminated body by laminating a plurality of metal plate members together;
    a step for laminating porous pressing pads formed by laminating inorganic fiber materials having resistances to heat in at least one side surface of this metal plate laminated body; and
    a step for compressing the pressing pads by pressing the metal plate laminated body and the pressing pads between a pair of metallic molds and diffusely bonding the metal plate members together by discharging air from this metal plate laminated body so as to form a vacuum and heating this metal plate laminated body.

9. A metal sandwich structural body comprising:
    a pair of surface plates made of superplastic metal material; and
    a plurality of core bodies interposed between the surface plates,
    wherein each core body is comprised of one plastic and deformable metal plate which is divided into at least two core members by at least one notch, each having end portions and a middle portion;
    the middle portion of said core members or one end thereof is bonded to the inner surface of one of said surface plates;
    the middle portion of the other of said core members or one end thereof is bonded to the inner surface of other surface plate; and
    said core members are integrated with each other at both ends or at one end, to form at least two free end portions or at least one free end portion, movable with respect to the surface plates.

* * * * *